United States Patent
Davidsson et al.

(10) Patent No.: US 9,421,972 B2
(45) Date of Patent: Aug. 23, 2016

(54) METHOD AND ARRANGEMENT FOR PICK-UP POINT RETRIEVAL TIMING

(71) Applicant: VOLVO CAR CORPORATION, Gothenburg (SE)

(72) Inventors: Staffan Davidsson, Vastra Frolunda (SE); Sicheng Chen, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 14/478,528

(22) Filed: Sep. 5, 2014

(65) Prior Publication Data
US 2015/0073645 A1   Mar. 12, 2015

(30) Foreign Application Priority Data
Sep. 12, 2013  (EP) .................................... 13184100

(51) Int. Cl.
| | |
|---|---|
| *G01C 22/00* | (2006.01) |
| *H04W 4/00* | (2009.01) |
| *B60W 30/06* | (2006.01) |
| *B62D 15/02* | (2006.01) |
| *E04H 6/42* | (2006.01) |
| *G05D 1/02* | (2006.01) |

(52) U.S. Cl.
CPC ........... *B60W 30/06* (2013.01); *B62D 15/0285* (2013.01); *E04H 6/422* (2013.01); *G05D 1/021* (2013.01); *B60T 2201/10* (2013.01)

(58) Field of Classification Search
CPC . G01C 21/206; G05D 1/0088; G05D 1/0225; G05D 1/0246; G05D 1/0274; G05D 1/0278; G05D 2201/0212; G05D 2201/0213; H04N 7/183

USPC .............. 701/409, 23, 29; 455/466; 707/769, 707/E17.014; 705/13, 1
See application file for complete search history.

(56) References Cited

U.S. PATENT DOCUMENTS

| | | |
|---|---|---|
| 2008/0051951 A1 | 2/2008 | Camacho |
| 2011/0274523 A1 | 11/2011 | Petalas |

(Continued)

FOREIGN PATENT DOCUMENTS

| | | |
|---|---|---|
| DE | 102012008858 | 11/2012 |
| EP | 2626279 | 8/2013 |
| WO | 2009081389 | 7/2009 |

OTHER PUBLICATIONS

Extended European Search Report for EP 13184100.9, Completed by the European Patent Office, Dated Feb. 20, 2014, 6 Pages.

(Continued)

*Primary Examiner* — Muhammad Shafi
(74) *Attorney, Agent, or Firm* — Brooks Kushman P.C.

(57) ABSTRACT

A method and arrangement are described for pick-up point retrieval timing in a vehicle having autonomous parking capabilities. The arrangement may include a communication interface arranged to receive data concerning a desired retrieval time. A processor may be arranged to monitor one or more parameters while the vehicle is performing autonomous driving along a route to a final slot until autonomous parking of the vehicle has been completed. The processor may be further arranged to calculate when to start autonomous return travel in order to be at the pick-up point at the desired retrieval time based on at least one monitored parameter. An actuator may be arranged to initiate autonomous travel to the pick-up point at the calculated return travel start time.

10 Claims, 5 Drawing Sheets

(56) References Cited

U.S. PATENT DOCUMENTS

| | | | | |
|---|---|---|---|---|
| 2012/0041675 A1* | 2/2012 | Juliver | ............ | G06Q 10/08 |
| | | | | 701/465 |
| 2013/0041917 A1* | 2/2013 | Woolworth | ............ | G08G 1/205 |
| | | | | 707/769 |
| 2013/0231824 A1* | 9/2013 | Wilson | ............ | G05D 1/0088 |
| | | | | 701/26 |

OTHER PUBLICATIONS

Jagadhambal et al. International Journal of Science, Engineering and Technology Research Jan. 2013, vol. 2, Issue 4, p. 998-1002.

* cited by examiner

METHOD AND ARRANGEMENT FOR PICK-UP POINT RETRIEVAL TIMING

CROSS-REFERENCE TO RELATED APPLICATIONS

This application claims foreign priority benefits under 35 U.S.C. §119(a)-(d) to European patent application number EP 13184100.9, filed Sep. 12, 2013, which is incorporated herein by reference in its entirety.

TECHNICAL FIELD

Embodiments herein relate to an arrangement for pick-up point retrieval timing in a vehicle having autonomous parking capabilities.

Further embodiments herein relate to a method for pick-up point retrieval timing in a vehicle having autonomous parking capabilities Still further embodiments herein relate to a vehicle having autonomous parking capabilities comprising an arrangement for pick-up point retrieval timing.

BACKGROUND

One area of automotive vehicle technology that is evolving rapidly is the area of autonomous or semi-autonomous drive capabilities. This is enabled through the introduction of sensors, for sensing vehicle parameters and surroundings, and actuators, for controlling different vehicle functionalities, such as steering, throttling and braking. Increased on-board data processing capabilities ties together these sensors and actuators such that the autonomous or semi-autonomous drive capabilities are enabled.

One area where these autonomous or semi-autonomous drive capabilities are envisaged to be of significant use in the near future is the area of vehicle parking.

Currently, as a vehicle driver arrives at a desired destination, he/she will often have to spend a significant amount of time searching for an unoccupied parking slot, which sometimes, when found, turns out to be located at a substantial distance from the actual destination. This distance may be an inconvenience to the driver both in that it will take some time to walk to the desired destination and in that the driver most likely also will be exposed to any adverse weather that might occur, such as rainstorms. Conversely, as the vehicle driver desires to leave the destination, he/she will have to perform the same walk in the opposite direction.

Today, parking services, such as valet parking services, for parking a vehicle at a premise, such as a hotel, a restaurant, an apartment building, a department store, a business center or a business building, etc., are sometimes provided in order to reduce such inconvenience to vehicle drivers. Valet parking is usually provided in a form in which a valet parking assistant is handed the keys to the vehicle and thereafter directly parks the vehicle in place of a vehicle driver. In this way inconvenience to the vehicle driver is reduced when requiring parking of the vehicle at a desired destination. Conversely, as the vehicle driver desires to leave the premises, he/she consults a valet desk and request retrieval of the vehicle and then waits for the vehicle to be retrieved by a valet parking assistant. Once the vehicle has been retrieved it is handed over to the driver who then may drive away to a subsequent destination.

In the near future, as more vehicles are fitted with autonomous drive capabilities, auto parking is likely to be introduced to vehicle drivers. Such service will include both autonomous driving that drives a vehicle to a final slot within a parking lot in an unmanned manner, and autonomous parking that enables the vehicle to be parked in the final slot in an unmanned manner. The need for the driver to walk from a parking lot to the premise he/she desires to visit may thus be eliminated. As a consequence, the parking may also be located much further from the desired destination when auto parking is available. This may be particularly useful at inner city locations where space for parking is limited.

However, as autonomous parking and retrieval of the vehicle may involve unknown and sometimes significantly greater distances the pick-up time may become quite long and above all inestimable to a current vehicle driver.

SUMMARY

Embodiments herein aim to provide an improved arrangement for pick-up point retrieval timing in a vehicle having autonomous parking capabilities.

This is provided through an arrangement comprising a communication interface arranged to receive data concerning a desired retrieval time; a processor, which is arranged to monitor one or more parameters while the vehicle is performing autonomous driving along the route to the final slot until autonomous parking of the vehicle has been completed; which processor further is arranged to calculate when to start autonomous return travel in order to be at the pick-up point at the desired retrieval time based on at least one monitored parameter; and an actuator arranged to initiate autonomous travel to the pick-up point at the calculated return travel start time.

Utilizing monitored parameters during parking of the vehicle for calculating when to start autonomous return travel provides for eliminated or at least significantly reduced waiting times when retrieving an autonomously parked vehicle.

According to a second aspect the communication interface is further arranged to receive data concerning the desired retrieval time through being paired with a personal communication device of a current vehicle user.

The pairing with a personal communication device of a current vehicle user provides for secure and comfortable interaction with a parked vehicle for retrieval.

According to a third aspect the processor is further arranged to monitor a time duration while the vehicle performs autonomous driving along the route to the final slot until autonomous parking of the vehicle has been completed and perform the calculation of the return travel start time based on at least the thus acquired time duration.

The provision of monitoring a time duration while the vehicle performs autonomous parking provides for a simple and reliable way of obtaining a high quality measure for performing calculation of a return travel start time for a particular parking scenario.

According to a fourth aspect the processor is further arranged to monitor vehicle velocity and map data while the vehicle performs autonomous driving along the route to the final slot until autonomous parking of the vehicle has been completed and perform the calculation of the return travel start time based on at least the thus acquired vehicle velocity and map data.

The provision of monitoring vehicle velocity and map data while the vehicle performs autonomous parking provides for an alternative simple and reliable way of obtaining a high quality measure for performing calculation of a return travel start time for a particular parking scenario.

According to a fifth aspect the communication interface is further arranged to receive data concerning a desired retrieval time from third party applications which contains information about event ending times for events associated with the parking location or with a personal agenda of a current vehicle user.

The provision of arranging the communication interface to receive data concerning a desired retrieval time from third party applications provides for increased convenience for a current vehicle user as retrieval may be automatically timed to event and/or calendar event ending times.

According to a sixth aspect the communication interface further is arranged to receive updated replacement data concerning a desired retrieval time from third party applications which contains information about changes in event ending times for events associated with the parking location or with a personal agenda of a current vehicle user.

The provision of arranging the communication interface to receive updated replacement data concerning a desired retrieval time from third party applications provides for further increased convenience for a current vehicle user as retrieval may be automatically timed to changes is event and/or calendar event ending times.

According to a seventh aspect the communication interface is further arranged to receive data concerning a desired retrieval time for events which repeats on the calendar on a regular basis, and in that the arrangement further comprises memory means for memorizing the data for the repeated retrieval times, and the actuator further being arranged to initiate autonomous return travel at the memorized return travel start time.

The provision of arranging the communication interface to receive and memorize data concerning a desired retrieval time for events which repeats on the calendar on a regular basis provides for yet further increased convenience for a current vehicle user as retrieval may be automatically timed to the repeat events.

According to an eight aspect the communication interface is further arranged to receive data concerning a desired retrieval time for events which repeats on the calendar on a regular basis, and in that the arrangement further comprises memory means for memorizing the data for the repeated retrieval times for a predetermined parking location, and the actuator is further arranged to initiate autonomous return travel at the memorized return travel start time when the vehicle is parked at the predetermined parking location.

The provision of tying the repeat event retrieval timing to a predetermined parking location provides for an avoidance of erroneous retrieval if the current vehicle user deviates from the repeated schedule.

According to a ninth aspect a motor vehicle having autonomous parking capabilities is provided which comprises an arrangement for pick-up point retrieval timing, as described herein.

A motor vehicle having autonomous parking capabilities comprising an arrangement for pick-up point retrieval timing, as described herein, will provide eliminated or at least significantly reduced waiting times for subsequent retrieval of the vehicle following having been autonomously parked.

According to a tenth aspect is further provided a method for pick-up point retrieval timing in a vehicle having autonomous parking capabilities.

This is provided through a method comprising the steps of: receiving data concerning a desired retrieval time; monitoring one or more parameters while the vehicle is performing autonomous driving along the route to the final slot until autonomous parking of the vehicle has been completed; calculating when to start autonomous return travel in order to be at the pick-up point at the desired retrieval time based on at least one monitored parameter; and initiating autonomous travel to the pick-up point at the calculated return travel start time.

Utilizing monitored parameters during parking of the vehicle for calculating when to start autonomous return travel provides for an efficient method that allows for eliminated or at least significantly reduced waiting times when retrieving an autonomously parked vehicle.

BRIEF DESCRIPTION OF THE DRAWINGS

In the following, embodiments herein will be described in greater detail by way of example only with reference to attached drawings, in which.

Still other objects and features of embodiments herein will become apparent from the following detailed description considered in conjunction with the accompanying drawings. It is to be understood, however, that the drawings are designed solely for purposes of illustration and not as a definition of the limits hereof, for which reference should be made to the appended claims. It should be further understood that the drawings are not necessarily drawn to scale and that, unless otherwise indicated, they are merely intended to conceptually illustrate the structures and procedures described herein. Like reference numerals designate like elements throughout the specification.

DETAILED DESCRIPTION

Embodiments herein will now be described more fully with reference to the accompanying drawings, in which example embodiments are shown. However, this application should not be construed as limited to the embodiments set forth herein. Disclosed features of example embodiments may be combined as readily understood by one of ordinary skill in the art to which this application belongs. Unless explicitly described to the contrary, the word "comprise" and variations such as "comprises" or "comprising" will be understood to imply the inclusion of stated elements but not the exclusion of any other elements.

Figure 1:
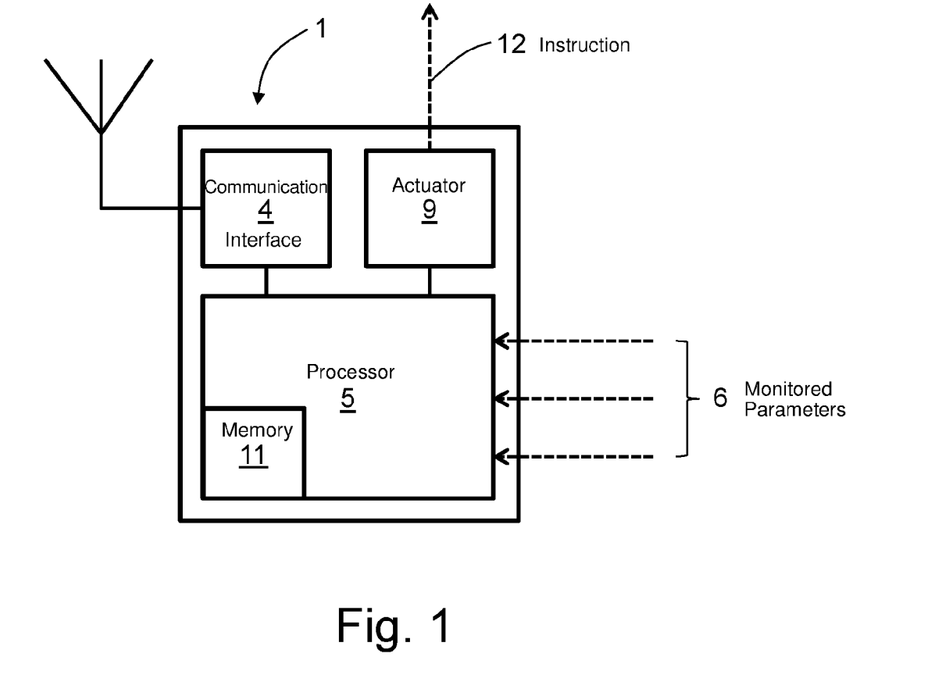
FIG. 1 is a schematic illustration of an arrangement for pick-up point retrieval timing in a vehicle having autonomous parking capabilities.

FIG. 1 is a schematic illustration of an arrangement 1 for pick-up point 2 retrieval timing in a vehicle 3 having autonomous parking capabilities according to an exemplary embodiment. The pick-up point 2 can represent a specific geographic location where the vehicle 3 is to be picked up by the user, e.g. as defined by map data or alternatively as defined by a position of a personal communication device 10 of a current vehicle 3 user obtained from a global positioning system (GPS) thereof, or similar.

For simplicity only passenger car vehicles 3 will be considered in the following description. However, the teachings provided herein may be expanded to consider commercial vehicles 3, such as buses, trucks and similar vehicles 3 having autonomous parking capabilities, without loss of generality.

The arrangement 1 comprises a communication interface 4 arranged to receive data concerning a desired retrieval time. The communication interface 4 may be an interface arranged and suitable to receive data via wireless communication, such as cellular communication, Bluetooth communication, Satellite communication, Infrared Data Association standard (IrDA) communication, wireless fidelity (WiFi) communication, and worldwide interoperability for microwave access (WiMAX) communication. Further, the communication path 13 can traverse a number of network topologies and distances. For example, the communication path can include direct connection, personal area network (PAN), local area network (LAN), metropolitan area network (MAN), wide area network (WAN) or any combination thereof.

Figure 2:
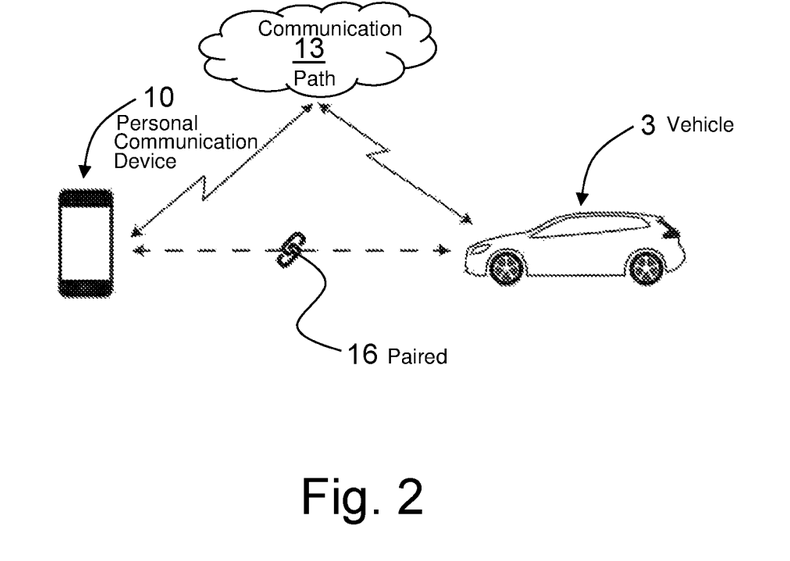
FIG. 2 is a schematic illustration of a connection between a mobile device/computer to a vehicle with autonomous drive function.

In embodiments hereof the communication interface 4 is further arranged to receive data concerning the desired retrieval time through being paired 16 with a personal communication device 10 of a current vehicle 3 user, e.g. a mobile device or terminal such as a cell phone, a smart phone, an embedded device, a tablet computer or a personal digital assistant (PDA). Pairing is used to link the arrangement 1 for pick-up point 2 retrieval timing uniquely to the personal communication device 10 of the current vehicle 3 user, so that only the paired device 10 can access the arrangement 1 for pick-up point 2 retrieval timing. This setup contains a connection 13 between the personal communication device 10 of the current vehicle 3 user to a vehicle 3 with autonomous drive function as illustrated in FIG. 2.

The arrangement 1 further comprises a processor 5, which is arranged to monitor one or more parameters 6 while the vehicle 3 is performing autonomous driving along the route 7 to the final slot 8 until autonomous parking of the vehicle 3 has been completed. The processor 5 may be a microprocessor or the like, and may include a memory and stored computer executable instructions for performing operation described herein. The term parameter 6 is here used to identify a characteristic, a feature, a measurable factor or any other kind of recordable data which relates to the scenario where the vehicle 3 is performing autonomous driving along the route 7 to the final slot 8, up until autonomous parking of the vehicle 3 has been completed.

A vehicle 3 having autonomous parking capabilities will include a vehicle 3 controller (not shown), which may comprise a microprocessor or the like, and which may include a memory and stored computer executable instructions for performing operations described herein, such as controlling unmanned driving. The vehicle 3 controller will e.g. receive the route 7 to the location of the final slot 8 via the communication interface 4, and then control the vehicle 3 so that the vehicle 3 can perform autonomous driving along the route 7 to the final slot 8 in an unmanned manner. Usually, when a fixed or movable obstacle is present in the route 7 to the final slot 8, the vehicle 3 controller will detect the object, using vehicle 3 sensor systems (not shown) that comprises one or more of a Radio Detection And Ranging (RADAR) sensor, a Light Detection And Ranging (LIDAR) sensor, a Light Amplification by Stimulated Emission of Radiation (LASER) sensor, an ultrasound sensor, an infrared sensor, an image sensor, or any combination thereof. Thereafter the vehicle 3 controller will control vehicle 3 actuators (not shown), such as steering, braking and throttle actuators, in order to avoid the detected obstacle, or temporarily halt vehicle 3 travel in order to avoid a collision with the detected object.

The processor 5 of the arrangement 1 is further arranged to calculate when to start autonomous return travel in order to be at the pick-up point 2 at the desired retrieval time based on at least one monitored parameter 6.

In some embodiments hereof the processor 5 is further arranged to monitor a time duration while the vehicle 3 performs autonomous driving along the route 7 to the final slot 8 until autonomous parking of the vehicle 3 has been completed and perform the calculation of the return travel start time based on at least the thus acquired time duration.

Figure 3:
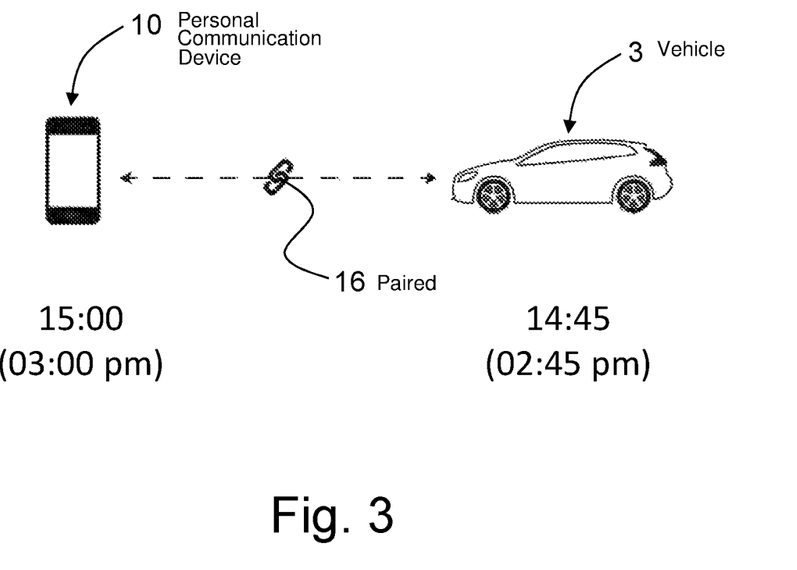
FIG. 3 is a schematic illustration how a return travel time for pick-up is calculated based on navigation.

The time duration may be acquired from timer data present in systems such as e.g. the vehicle 3 controller, the processor 5 or supplied via the communication interface 4 or from a vehicle 3 navigation system, such as a global positioning system (GPS) or equivalent, or from any system associated with the vehicle 3 comprising timing circuits. For instance, as illustrated in FIG. 3, if the autonomous parking trip had a duration of 15 minutes and the pickup time is 15.00 (3:00 p.m.) the vehicle 3 is arranged to start autonomous return travel at 14.45 (2:45 p.m.).

Figure 4:
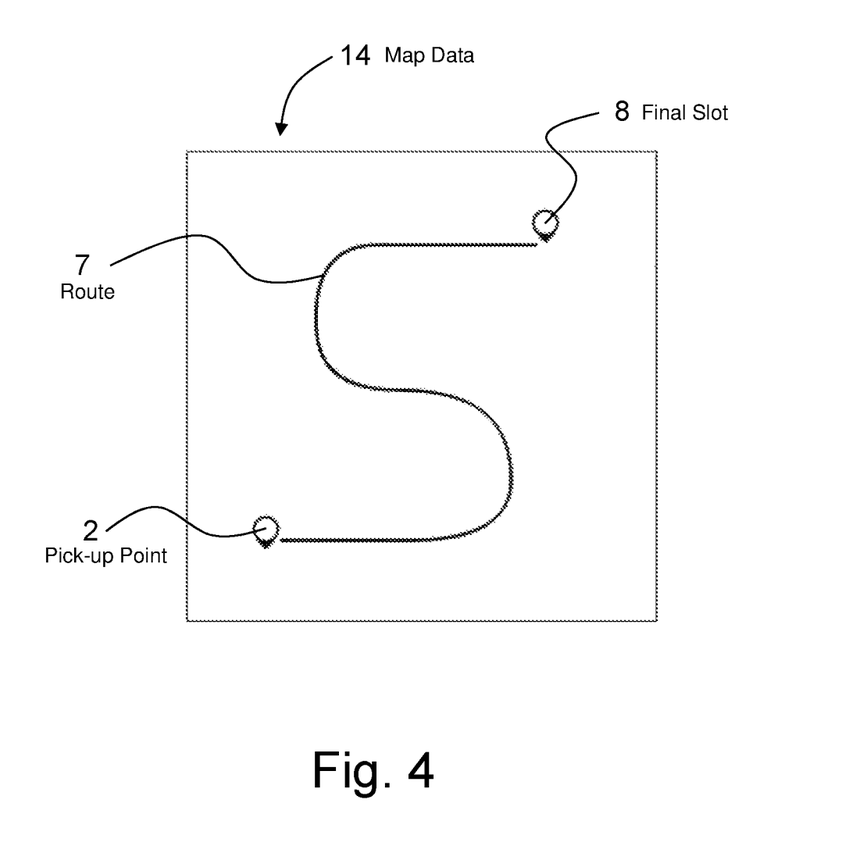
FIG. 4 is a schematic illustration of how a user may set a pick-up time and the retrieval timer starts the return travel time for pick-up earlier.

In other embodiments hereof the processor 5 is further arranged to monitor vehicle 3 velocity and map data 14, as illustrated in FIG. 4, while the vehicle 3 performs autonomous driving along the route 7 to the final slot 8 until autonomous parking of the vehicle 3 in the final slot 8 has been completed and perform the calculation of the return travel start time based on at least the thus acquired vehicle 3 velocity and map data 14. For example, if the speed limit for autonomous parking according to FIG. 4 is 20 km/h (12.4 mph) the estimated travelling time from the final slot 8, e.g. according to vehicle 3 GPS position data, to the pick-up point 2 will be 3.6 minutes.

Vehicle 3 velocity data may be acquired from velocity data present in systems such as e.g. the vehicle 3 controller, the processor 5 or supplied via sensors provided in the vehicle 3 drive-line or from a vehicle 3 navigation system, such as a global positioning system (GPS) or equivalent, or from any system associated with the vehicle 3 comprising vehicle 3 velocity data.

Map data 14 may be acquired from map data 14 present in systems such as e.g. a vehicle 3 navigation system, such as a global positioning system (GPS) or equivalent or a parking area map supplied via the communication interface 4. The parking area map may include information about a parking space, parking route information including a route to the parking space, and slot information including information about all slots in the parking space.

In further embodiments hereof the processor 5 is further arranged to monitor both a time duration and vehicle 3 velocity and map data 14 while the vehicle 3 performs autonomous driving along the route 7 to the final slot 8 until autonomous parking of the vehicle 3 has been completed and perform the calculation of the return travel start time based on at least the thus acquired time duration and vehicle 3 velocity and map data 14.

The arrangement 1 also comprises an actuator 9 arranged to initiate autonomous travel to the pick-up point 2 at the calculated return travel start time. This actuator 9 may be arranged to initiate autonomous travel to the pick-up point 2 at the calculated return travel start time through communicating an instruction 12 to initiate performance of return travel to the vehicle 3 controller.

In yet further embodiments hereof the communication interface 4 is further arranged to receive data concerning a desired retrieval time from third party applications which contains information about event ending times for events associated with the parking location or with a personal agenda of a current vehicle 3 user.

The information about event ending times is applicable to such events as sporting events, theater or opera events, cinema events, travel events e.g. information on an expected arrival time for a flight, a train, a bus or other means of transportation. The information about event ending times is applicable to calendar reminders for such events.

Figure 5:
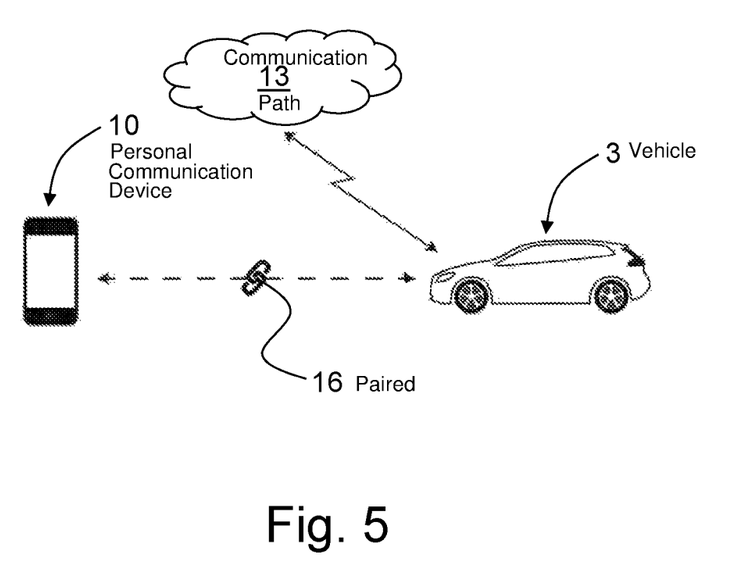
FIG. 5 is a schematic illustration of an airport pick-up scenario.

For instance, as illustrated in FIG. 5, when a flight of a current vehicle 3 user has landed at an airport where the vehicle 3 has been parked previously, it is convenient to set a pick-up time for the vehicle 3 that matches the flight arrival time. In this way it is possible to set up this pick-up time for the vehicle 3 already before takeoff. This may be done by the current vehicle 3 user through e.g. a mobile device such as a cell phone, a tablet computer or a personal digital assistant (PDA) or alternatively through a third party application, e.g. associated with the airline or other source of flight information. It is preferred that such third party applications are only allowed to provide such information about event ending times upon authorization by the current vehicle 3 user.

Alternatively, a pick-up time for the vehicle 3 that matches an event ending time may be set through a third party application, e.g. associated with the premises at which the current vehicle 3 user is attending an event, e.g. a sporting arena, a theatre or a cinema. This may e.g. be made possible through associating the parking location with the premises and thus with a current event at these premises.

In still further embodiments hereof the communication interface 4 is further arranged to receive updated replacement data concerning a desired retrieval time from third party applications, which contains information about changes in event ending times for events associated with the parking location or with a personal agenda of a current vehicle 3 user.

This may be useful for the above flight example, as illustrated in FIG. 5, as updates to the expected flight arrival time then automatically may be communicated to the vehicle 3 over the communication path 13 and alter the pick-up time for the vehicle 3 to match the new expected flight arrival time, thus avoiding that the vehicle 3 turns up at the pick-up point 2 at an inconvenient time.

It may also be useful for the second example provided above, associating the parking location with the premises and with a current event at these premises, as updates to the expected event ending time for the current event at these premises then automatically may alter the pick-up time for the vehicle 3 to match the new expected event ending time, thus avoiding that the vehicle 3 turns up at the pick-up point 2 at an inconvenient time.

In yet further embodiments hereof the communication interface 4 is further arranged to receive data concerning a desired retrieval time for events which repeats on the calendar on a regular basis, and that the arrangement 1 further comprises memory means 11, which may be any type of computer memory suitable for storing data and/or computer executable instructions, for memorizing the data for the repeated retrieval times, and the actuator 9 further arranged to initiate autonomous return travel at the memorized return travel start time.

This is beneficial for frequent users, such as people who go to work from home or go out of work every day at a certain time, or go to the gym e.g. every Friday at 19:00 (7:00 p.m.), having their vehicle 3 pick them up automatically is a benefit.

In still further embodiments hereof the communication interface 4 is further arranged to receive data concerning a desired retrieval time for events which repeats on the calendar on a regular basis, and that the arrangement 1 further comprises memory means 11 for memorizing the data for the repeated retrieval times for a predetermined parking location, and the actuator 9 further arranged to initiate autonomous return travel at the memorized return travel start time when the vehicle 3 is parked at the predetermined parking location.

Restricting the memorized repeated retrieval such that the vehicle 3 is only retrieved when the vehicle 3 is parked at the predetermined parking location assist in avoiding erroneous retrieval if the current vehicle 3 user e.g. is on vacation or similar, and thus has no intention of attending the repeat event.

The processor 5 does not necessarily have to be arranged to calculate when to start autonomous return travel in order to be at the pick-up point 2 at the desired retrieval time to a time equal to the event end time. As an example, the processor 5 may be arranged to calculate when to start autonomous return travel in order to be at the pick-up point 2 at the desired retrieval time adding time, e.g. 10 minutes, for the user to walk from his current location to the pick-up point 2.

According to the present application is also envisaged a motor vehicle 3 having autonomous parking capabilities that comprises an arrangement 1 for pick-up point 2 retrieval timing, as described herein.

Further, according to the present application is also envisaged a method for pick-up point 2 retrieval timing in a vehicle 3 having autonomous parking capabilities. The proposed method comprises the steps of: receiving data concerning a desired retrieval time; monitoring one or more parameters 6 while the vehicle 3 is performing autonomous driving along the route 7 to the final slot 8 until autonomous parking of the vehicle 3 has been completed; calculating when to start autonomous return travel in order to be at the pick-up point 2 at the desired retrieval time based on at least one monitored parameter 6; and initiating autonomous travel to the pick-up point 2 at the calculated return travel start time.

In accordance with the teachings hereof, use of vehicles 3 having autonomous parking capabilities with the proposed arrangement 1 will reduce the time spent by a current vehicle 3 user searching a parking area for the parked vehicle 3, as well as the time to leave the parking area, i.e. the time to recover the vehicle 3 and drive out of the parking lot.

Furthermore, parking related accidents can be avoided as the vehicle 3 driver as well as any other vehicle 3 occupants no longer needs to enter the parking lot for retrieval.

In addition, timely retrieval of autonomously parked vehicles 3 is particularly environmentally friendly, since the vehicles 3 only will have to be moved once to be at the pick-up spot at the appropriate time and any idling at the pick-up spot is minimized.

Although the above description only describes passenger car vehicles 3, the teachings provided herein may, without loss of generality, be expanded to consider commercial vehicles 3, such as buses, trucks and similar vehicles 3 having autonomous parking capabilities, without loss of generality. The above-described embodiments may be varied within the scope of the following claims.

Thus, while there have been shown and described and pointed out fundamental novel features of the embodiments herein, it will be understood that various omissions and substitutions and changes in the form and details of the devices illustrated, and in their operation, may be made by those skilled in the art. For example, it is expressly intended that all combinations of those elements and/or method steps which perform substantially the same function in substantially the same way to achieve the same results are equivalent. Moreover, it should be recognized that structures and/or elements and/or method steps shown and/or described in connection with any disclosed form or embodiment herein may be incorporated in any other disclosed or described or suggested form or embodiment as a general matter of design choice.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure.

What is claimed is:

1. An arrangement for pick-up point retrieval timing in a vehicle having autonomous parking capabilities, the arrangement comprising:
   a communication interface configured to receive data concerning a desired retrieval time;
   a processor configured to monitor one or more parameters while the vehicle is performing autonomous driving along a route to a final parking slot until autonomous parking of the vehicle has been completed;
   wherein the processor further is configured to calculate when to start autonomous return travel in order to be at the pick-up point at the desired retrieval time based on at least one monitored parameter; and
   an actuator configured to initiate autonomous travel to the pick-up point at a calculated return travel start time.

2. The arrangement according to claim 1 wherein the communication interface further is configured to receive data concerning the desired retrieval time through being paired with a personal communication device of a vehicle user.

3. The arrangement according to claim 1 wherein the processor further is configured to monitor a time duration while the vehicle performs autonomous driving along the route to the final slot until autonomous parking of the vehicle has been completed and perform the calculation of the return travel start time based on at least the thus acquired time duration.

4. The arrangement according to claim 1 wherein the processor further is configured to monitor vehicle velocity and map data while the vehicle performs autonomous driving along the route to the final slot until autonomous parking of the vehicle has been completed and perform the calculation of the return travel start time based on at least the thus acquired vehicle velocity and map data.

5. The arrangement according to claim 1 wherein the communication interface further is configured to receive data concerning a desired retrieval time from third party applications which contains information about event ending times for events associated with a parking location or with a personal agenda of a vehicle user.

6. The arrangement according to claim 5 wherein the communication interface further is configured to receive updated replacement data concerning a desired retrieval time from third party applications which contains information about changes in event ending times for events associated with a parking location or with a personal agenda of a vehicle user.

7. The arrangement according to claim 1 wherein the communication interface further is configured to receive data concerning a desired retrieval time for events which repeat on a calendar on a regular basis, and in that the arrangement further comprises memory means for memorizing the data for the repeated retrieval times, and the actuator further being arranged to initiate autonomous return travel at the memorized return travel start time.

8. The arrangement according to claim 1 wherein the communication interface further is configured to receive data concerning a desired retrieval time for events which repeat on a calendar on a regular basis, and in that the arrangement further comprises memory means for memorizing the data for the repeated retrieval times for a predetermined parking location, and the actuator further being arranged to initiate autonomous return travel at the memorized return travel start time when the vehicle is parked at the predetermined parking location.

9. A motor vehicle having autonomous parking capabilities, the vehicle comprising an arrangement for pick-up point retrieval timing according to claim 1.

10. A method for pick-up point retrieval timing in a vehicle having autonomous parking capabilities, the method comprising:
    receiving, by a communication interface, data concerning a desired retrieval time;
    monitoring, by a processor, one or more parameters while the vehicle is performing autonomous driving along a route to a final parking slot until autonomous parking of the vehicle has been completed;
    calculating, by the processor, when to start autonomous return travel in order to be at the pick-up point at the desired retrieval time based on at least one monitored parameter; and
    initiating, by an actuator, autonomous travel to the pick-up point at a calculated return travel start time.

* * * * *